United States Patent
Pallett et al.

(10) Patent No.: US 8,406,983 B2
(45) Date of Patent: *Mar. 26, 2013

(54) ENGINE IDLE SPEED AND TURBOCHARGER SPEED CONTROL

(75) Inventors: Tobias John Pallett, Farmington, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,965

(22) Filed: Mar. 6, 2012

(65) Prior Publication Data

US 2012/0173123 A1 Jul. 5, 2012

Related U.S. Application Data

(62) Division of application No. 11/926,357, filed on Oct. 29, 2007, now Pat. No. 8,131,446.

(51) Int. Cl.
*B60T 7/12* (2006.01)
(52) U.S. Cl. ............... 701/103; 123/339.1; 123/434; 123/672
(58) Field of Classification Search .......... 701/103, 701/104, 108, 114, 115; 123/339.1, 434, 123/436, 672
See application file for complete search history.

(56) References Cited

U.S. PATENT DOCUMENTS

| 6,382,177 B1 | 5/2002 | Saito |
| 6,619,033 B2 | 9/2003 | Adler et al. |
| 6,971,367 B2 | 12/2005 | Satou et al. |
| 7,275,516 B1 | 10/2007 | Cunningham et al. |
| 7,621,256 B2 | 11/2009 | Cunningham et al. |
| 7,895,827 B2 | 3/2011 | Wang et al. |
| 8,126,632 B2 | 2/2012 | Pallett et al. |
| 2002/0069851 A1 | 6/2002 | Doring et al. |

FOREIGN PATENT DOCUMENTS

| CN | 1982684 A | 6/2007 |
| CN | 101418741 A | 4/2009 |
| JP | 2003120353 A | 4/2003 |

OTHER PUBLICATIONS

Partial Translation of Office Action of Chinese Application No. 200810170744.2, Issued Sep. 18, 2012, State Intellectual Property Office of PRC, 8 Pages.
Partial Translation of Office Action of Chinese Application No. 200810170646.9, Issued Oct. 8, 2012, State Intellectual Property Office of PRC, 8 Pages.

*Primary Examiner* — John Kwon
(74) *Attorney, Agent, or Firm* — Julia Voutyras; Alleman Hall McCoy Russell & Tuttle LLP

(57) ABSTRACT

Various methods are described for controlling engine operation for an engine having a turbocharger and direction injection. One example method includes performing at least a first and second injection in response to a driver action. The first and second injection may be performed during a cylinder cycle, the first injection generating a lean combustion and the second injection injected after combustion such that it exits the cylinder unburned into the exhaust upstream of a turbine of the turbocharger.

7 Claims, 11 Drawing Sheets

ENGINE IDLE SPEED AND TURBOCHARGER SPEED CONTROL

CROSS REFERENCE TO RELATED APPLICATIONS

The present application is a divisional of U.S. patent application Ser. No. 11/926,357 filed Oct. 29, 2007, the entire contents of which are incorporated herein by reference for all purposes.

BACKGROUND AND SUMMARY

Engines may utilize turbocharging to increase power density and/or increase engine fuel efficiency. However, during transient conditions, such as a driver request for increased engine output, turbocharger inertia and flow dynamics may result in "turbo lag." Such lag may be reduced in some examples by reducing turbocharger size and weight, and/or taking various measures via engine control.

One control approach to address turbo lag uses a late fuel injection into lean diesel combustion to generate exhaust heat, thereby maintaining spin-up of the turbine of the turbocharger. Specifically, the late injection generates exhaust heat, which in turn increases the speed of the turbine. Then, when a transient occurs, such as a request for an increase in engine output, the turbine is already spinning fast enough to provide the rapid increase in engine output.

However, the inventors herein have recognized some issues with the above approach. In particular, in gasoline applications, the excess fuel used to generate increased exhaust heat may degrade fuel efficiency. For example, extended idle conditions may exist where it is unnecessary to maintain the system in a "ready" state throughout the entire operation.

The above issues may be at least partially addressed by a method for controlling engine operation for an engine having a turbocharger and direction injection in a vehicle driven by a driver, the method comprising: in response to a driver input, performing at least a first and second injection during a cylinder cycle, the first injection generating a lean combustion and the second injection injected after combustion such that it exits the cylinder unburned into the exhaust upstream of a turbine of the turbocharger, the performing of the first and second injection further responsive to turbocharger speed.

In this way, the turbocharger speed may be selectively maintained responsive to the driver's actions, which can indicate a likely intent to tip-in, for example, where turbo lag should be reduced. As another example, it may be possible to reduce fuel used to maintain turbocharger speed under selected deceleration condition, while still providing a desired fast tip-in response.

DETAILED DESCRIPTION

Figure 1:
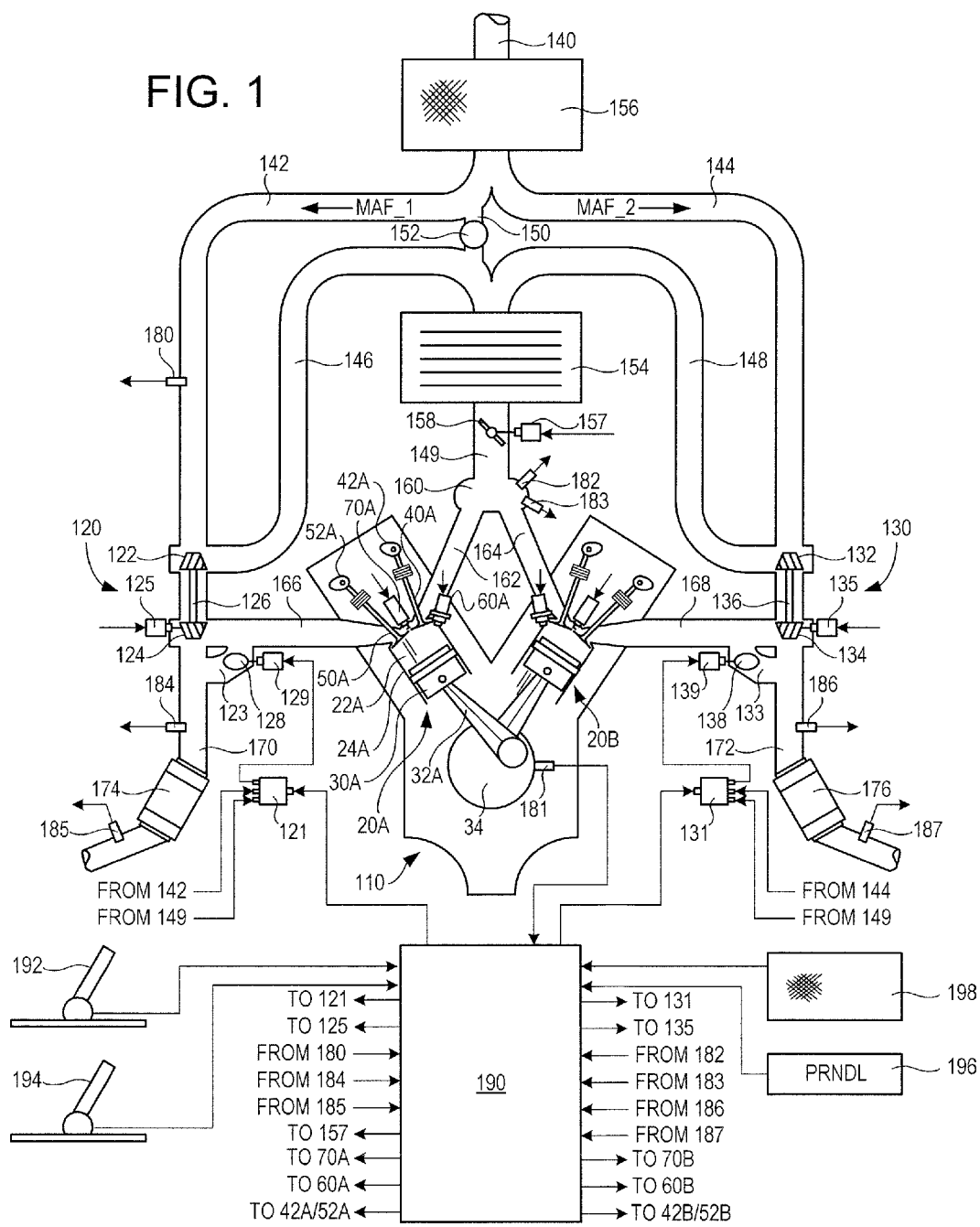
FIG. 1 shows a schematic depiction of an example engine system including twin turbochargers.

FIG. 1 shows a schematic depiction of an example engine system 100 including a multi-cylinder internal combustion engine 110 and twin turbochargers 120 and 130. As one non-limiting example, engine system 100 can be included as part of a propulsion system for a passenger vehicle. Also, while this example shows a twin turbocharger example, a single turbocharger, or more than two turbines and/or compressors may be used.

Engine system 100 can receive intake air via intake passage 140. Intake passage 140 can include an air filter 156. At least a portion of the intake air can be directed to a compression device or compressor 122 of turbocharger 120 via a first branch of the intake passage 140 as indicated at 142 and at least a portion of the intake air can be directed to a compressor 132 of turbocharger 130 via a second branch of the intake passage 140 as indicated at 144.

A first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160. In some examples, intake manifold 160 may include an intake manifold pressure sensor 182 and/or an intake manifold temperature sensor 183, each communicating with control system 190. Intake passage 149 can include an air cooler 154 and/or a throttle 158. The position of the throttle can be adjusted by the control system via a throttle actuator 157 communicatively coupled to control system 190. As shown in FIG. 1, an anti-surge valve 152 may be provided to selectively bypass turbochargers 120 and 130 via bypass passage 150. As one example, anti-surge valve 152 can open to enable flow through bypass passage 150 where the intake air pressure of the combined air flow attains a threshold value.

Engine 110 may include a plurality of cylinders two of which are shown in FIG. 1 as 20A and 20B. Note that in some examples, engine 110 can include more than two cylinders such as 4, 5, 6, 8, 10 or more cylinders. Cylinders 20A and 20B may be identical in some examples and include identical components. As such, only cylinder 20A is described in detail. Cylinder 20A includes a combustion chamber 22A defined by combustion chamber walls 24A. A piston 30A is disposed within combustion chamber 22A and is coupled to a crank shaft 34 via a crank arm 32A. Crank shaft 34 may include an engine speed sensor 181 that can identify the rotational speed of crank shaft 34. Engine speed sensor 181 can communicate with control system 190 to enable a determination of engine speed. Cylinder 20A can include a spark plug 70A for delivering an ignition spark to combustion chamber 22A. However, in some examples, spark plug 70A may be omitted, for example, where engine 110 is configured to provide combustion via compression ignition. Combustion chamber 22A may include a fuel injector 60A, which in this example is configured as a direct in-cylinder fuel injector. However, in some examples, fuel injector 60A can be configured as a port injector.

Cylinder 20A can further include at least one intake valve 40A actuated via an intake valve actuator 42A and at least one exhaust valve 50A actuated via an exhaust valve actuator 52A. Cylinder 20A can include two or more intake valves and/or two or more exhaust valves along with associated valve actuators. In this particular example, actuators 42A and 52A are configured as cam actuators, however, in other examples, electromagnetic valve actuators may be utilized.

Intake valve actuator 42A can be operated to open and close intake valve 40A to admit intake air into combustion chamber 22A via intake passage 162 communicating with intake manifold 160. Similarly, exhaust valve actuator 52A can be operated to open and close exhaust valve 50A to exhaust products of combustion from combustion chamber 22A into exhaust passage 166. In this way, intake air may be supplied to combustion chamber 22A via intake passage 162 and products of combustion may be exhausted from combustion chamber 22A via exhaust passage 166.

In one example, the system may include variable intake valve timing and/or variable exhaust valve timing. For example, the control may adjust relative intake valve opening and/or closing timing based on engine operating conditions.

It should be appreciated that cylinder 20B or other cylinders of engine 110 can include the same or similar components of cylinder 20A as described above. Thus, intake air may be supplied to combustion chamber 22B via intake passage 164 and products of combustion may be exhausted from combustion chamber 22B via exhaust passage 168. Note that in some examples a first bank of cylinders of engine 110 including cylinder 22A as well as other cylinders can exhaust products of combustion via a common exhaust passage 166 and a second bank of cylinders including cylinder 22B as well as other cylinders can exhaust products of combustion via a common exhaust passage 168.

Products of combustion that are exhausted by engine 110 via exhaust passage 166 can be directed through exhaust turbine 124 of turbocharger 120, which in turn can provide mechanical work to compressor 122 via shaft 126 in order to provide compression to intake air as described above. Alternatively, some or all of the exhaust gases flowing through exhaust passage 166 can bypass turbine 124 via turbine bypass passage 123 as controlled by wastegate 128. The position of wastegate 128 may be controlled by actuator 129 as directed by control system 190. As one non-limiting example, control system 190 can adjust the position of actuator 129 via a solenoid valve 121. In this particular example, solenoid valve 121 receives a pressure difference for facilitating the actuation of wastegate 128 via actuator 129 from the difference in air pressures between intake passage 142 arranged upstream of compressor 122 and intake passage 149 arranged downstream of compressor 122. As indicated by FIG. 1, control system 190 communicates with actuator 129 via solenoid valve 121. However, it should be appreciated that other examples other suitable approaches for actuating wastegate 128 may be used.

Similarly, products of combustion that are exhausted by engine 110 via exhaust passage 168 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 168 can bypass turbine 134 via turbine bypass passage 133 as controlled by wastegate 138. The position of wastegate 138 may be controlled by actuator 139 as directed by control system 190. The position of wastegate 138 may be controlled by actuator 139 as directed by control system 190. As one non-limiting example, control system 190 can adjust the position of actuator 139 via a solenoid valve 131. In this particular example, solenoid valve 131 receives a pressure difference for facilitating the actuation of wastegate 138 via actuator 139 from the difference in air pressures between intake passage 144 arranged upstream of compressor 132 and intake passage 149 arranged downstream of compressor 132. As indicated by FIG. 1, control system 190 communicates with actuator 139 via solenoid valve 131. However, it should be appreciated that in other examples other suitable approaches for actuating wastegate 138 may be used.

In some examples, exhaust turbines 124 and 134 may be configured as variable geometry turbines, whereby associated actuators 125 and 135 may be used to adjust the position of the turbine impeller blades to vary the level of energy that is obtained from the exhaust gas flow and imparted to their respective compressor. For example, the control system can be configured to independently vary the geometry of the exhaust gas turbines 124 and 134 via their respective actuators 125 and 135.

Products of combustion exhaust by one or more cylinders via exhaust passage 166 can be directed to ambient via exhaust passage 170. Exhaust passage 170 may include an exhaust aftertreatment device such as catalyst 174, and one or more exhaust gas sensors (such as air-fuel ratio sensors) indicated at 184 and 185, for example. Similarly, products of combustion exhaust by one or more cylinders via exhaust passage 168 can be directed to ambient via exhaust passage 172. Exhaust passage 172 may include an exhaust aftertreatment device such as catalyst 176, and one or more exhaust gas sensors indicated at 186 and 187, for example. Exhaust gas sensors 184, 185, 186, and/or 187 can communicate with control system 190.

Engine system 100 can include various other sensors. For example, at least one of intake passages 140, 142, and 144 can include mass air flow sensor 180. A mass airflow sensor may include, as one example, a hot wire anemometer or other suitable device for measuring mass flow rate of the intake air. As one particular example, a first intake passage branch 142 includes a mass air flow sensor 180 arranged upstream of compressor 122 while a second intake passage branch 144 does not include a mass air flow sensor, although one may be added, if desired. As another example, mass air flow sensor 180 may be arranged along intake passage 146 downstream of compressor 122. As yet another example, mass air flow sensor 180 may be arranged along intake passage 148 downstream of compressor 132. Regardless of the particular configuration, mass airflow sensor 180 can communicate with control system 190 as shown in FIG. 1.

Control system 190 can include one or more controllers configured to communicate with the various sensors and actuators described herein. As one example, control system 190 can include at least one electronic controller comprising one or more of the following: an input/output interface for sending and receive electronic signals with the various sensors and actuators, a central processing unit, memory such as random accessible memory (RAM), read-only memory (ROM), keep alive memory (KAM), each of which can communicate via a data bus. Control system 190 may include a proportional-integral-derivative (PID) controller in some examples. However, it should be appreciated that other suitable controllers may be used as can be appreciated by one skilled in the art in light of the present disclosure.

FIG. 1 further illustrates various operator interface elements, such as brake pedal 192, gas pedal 194, and transmission gear selected 196, each of which may transmit a corresponding signal to control system 190. Further, an example transmission 198 is shown, which may be coupled to the engine and transmit various signals to, or receive signals from, control system 190.

Control system 190 can be configured to vary one or more operating parameters of the engine on an individual cylinder basis. For example, the control system can adjust valve timing by utilizing a variable cam timing (VCT) actuator, spark timing by varying the time at which the spark signal is provided to the spark plug, and/or fuel injection timing and amount by varying the pulse width of the fuel injection signal that is provided to the fuel injector by the control system as will also be appreciated in light of the present disclosure. Thus, the spark timing, valve timing, and fuel injection timing can be actuated by the control system as will be described in greater detail herein.

Thus, FIG. 1 shows a non-limiting example of an engine system including twin turbochargers. In one example engine operation may be adjusted to increase and/or maintain turbocharger speed during conditions in which it would otherwise fall below a threshold valve resulting in increased turbo lag during subsequent requests for increased engine output. In one example, the turbocharger speed can be increased by utilizing an additional fuel injection pulse late in the combustion cycle, such as during an exhaust stroke, late in the expansion stroke, and/or early in the intake stroke (such as during valve overlap where boosted intake pressure forces flow through the cylinder and out into the exhaust manifold), where the combustion air-fuel ratio was lean of stoichiometry. In this way, excess air can react with injected fuel from the additional injection to generate exhaust heat and/or energy, and increase work extracted by the turbocharger.

However, while such operation can reduce turbo lag and provide faster torque increases, especially from idle conditions, such operation can also increase overall fuel usage. During extended idle conditions, such fuel usage may be significant to overall vehicle fuel economy. As such, in one embodiment, the turbocharger speed maintenance may be selectively used, or used to varying degrees, depending on operation conditions that may be indicative of an impending request to increase output. For example, release of a brake pedal may indicate an impending pedal tip-in, and thus trigger turbocharger speed maintenance at higher speeds in response thereto. Of course, other examples are also possible, such as those described below herein with reference to FIG. 2A, and others.

Figure 2A:
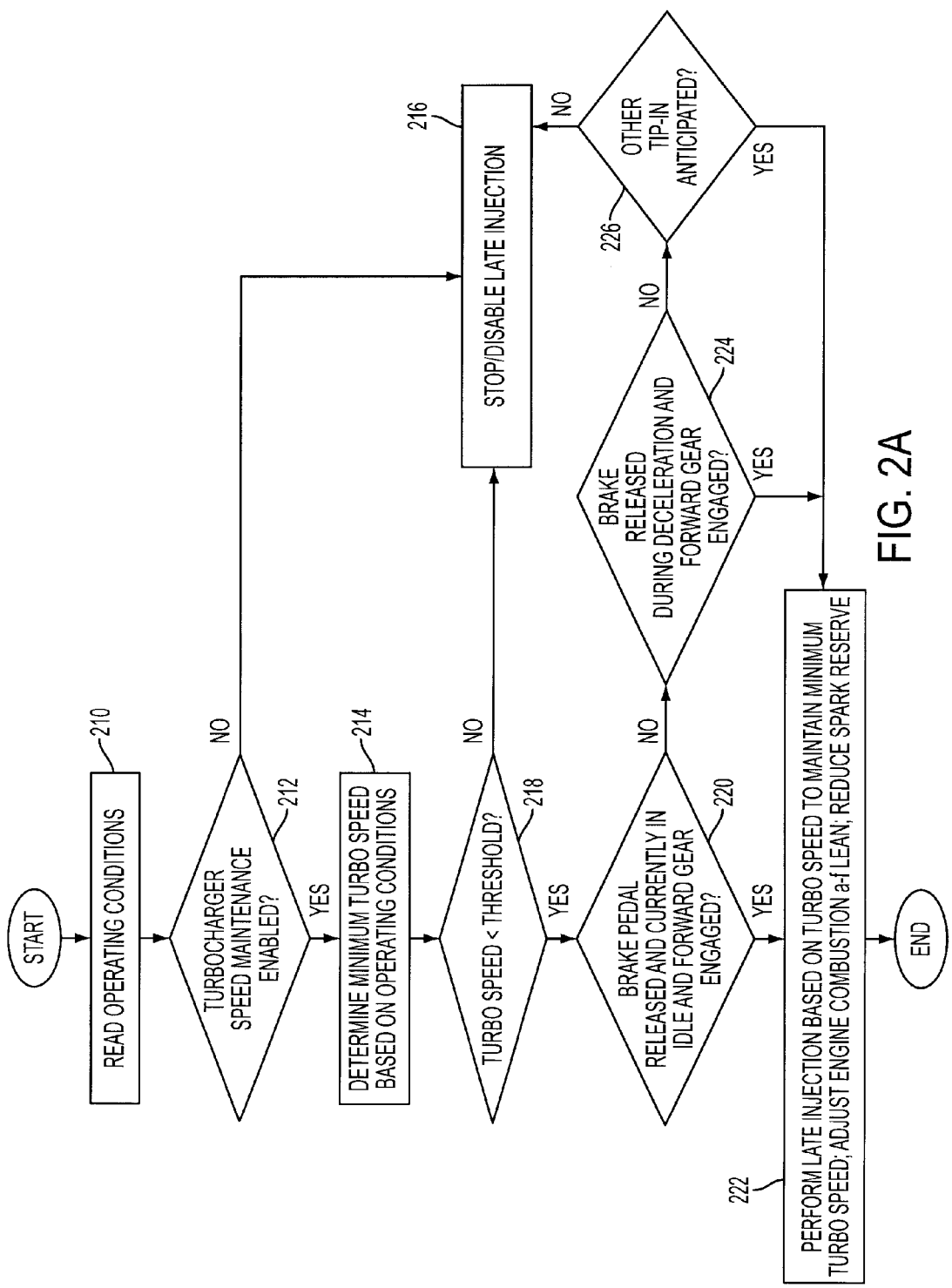
FIGS. 2A, 3-4, 6-7 and 9 show high level flow charts depicting example approaches for controlling engine and turbocharger operation.

Referring now to FIG. 2A, an example routine is described for controlling turbocharger speed maintenance. First, in 210, the routine reads operating conditions of the engine and/or vehicle, such as atmospheric conditions, temperatures, engine speed, requested engine output torque, desired engine speed, and others. Then, in 212, the routine determines whether turbocharger speed maintenance is enabled, such as based on a time since engine start, degradation status of the turbocharger, exhaust temperature, etc. If so, the routine continues to 214. If not, the routine continues to 216 to stop and/or disable any additional late injections.

In 214, the routine determines a minimum desired turbocharger speed based on operating conditions. Alternatively, or additionally, the routine may determine a minimum desired boost amount based on operating conditions. Next, in 218, the routine determines whether turbocharger speed is less than the minimum desired value (and/or whether the boost amount is less than the minimum desired boost amount). If not, again the routine proceeds to 216. If so, the routine continues to 220 to determine whether the brake pedal has been released and the engine is currently in an idle conditions (such as where engine speed is controlled to an idle speed), and the transmission is engaged in a forward gear. If so, this indicates that the driver may be about to request an increase in engine output (e.g., releasing the brake to depress the gas pedal), and thus the routine continues to 222 to perform turbocharger speed adjustment via additional direct fuel injection to maintain or achieve the minimum desired turbocharger speed (and/or minimum boost amount), in combination with at least enleaning combustion air-fuel ratio (e.g., as generated by a first injection amount) to provide excess air. Additionally, spark retard reserve can be reduced, as idle speed adjustments can be provided primarily via fuel injection adjustments to the fuel injection amounts in order to reduce the fuel economy penalty.

In one example, the amount of excess air may be coordinated with the amount of the additional injection, such that the overall exhaust air-fuel ratio is approximately stoichiometry. In this way, it may be possible to address issues of turbo lag, at least under some conditions, while limiting increases in fuel usage. In other words, the lag in engine torque response to requests to increase torque may be addressed by injecting fuel into the exhaust system via direct cylinder injection in order to keep the turbocharger spinning during tipped-out conditions to reduce turbo lag on a subsequent tip-in. Additionally, by providing sufficiently lean combustion so that the excess air matches the additional late fuel injection, an overall stiochiometric mixture can be provided to downstream catalysts (e.g., 174/176).

Furthermore, while additional injection of fuel to provide increased exhaust energy and increase turbocharger speed may have an effect on fuel economy, this may be offset at least in part by the adjustment of the lean combustion air-fuel ratio to maintain engine idle speed, and corresponding reduce and/or eliminate the typical spark retard (e.g., spark reserve) used to provide rapid idle speed feedback control. In other words, higher frequency idle speed errors may be compensated by adjusting combustion air-fuel ratio (e.g., via adjustment of the amount of a first fuel injection), and similarly compensating (decreasing) the additional late injection by a corresponding amount to maintain stoichiometry. Lower frequency errors may still be handled via airflow adjustment, such as via the throttle, boost pressure, etc. As such, the higher frequency adjustment to the fuel injection amounts for idle speed control would have a relatively negligible impact on turbocharger speed maintenance. In addition to fuel economy benefits of reducing and/or removing spark torque reserve, there may also be increased fuel economy by enabling operation with reduced pumping losses (potentially offset by increased boost pressure).

Returning to FIG. 2A, if the answer to 220 is no, the routine continues to 224 to determine whether the brake pedal was released during a vehicle deceleration condition and while a forward gear was engaged. If so, this may also indicate an imminent driver tip-in, and thus turbocharger speed maintenance may be utilized in 222. Otherwise, the routine continues to 226 to identify whether other conditions indicative of an increased potential for a driver tip-in are present, and if so, continue to 222. Otherwise, the routine continues to 216.

In an alternative embodiment, the action of 222 may be performed during deceleration and/or idle conditions, unless the driver is currently engaging the brake pedal and not the accelerator pedal (e.g., brake actuation is greater than a first threshold, and pedal actuation is less than a second threshold). Further, still other alternative approaches may be used. For example, while FIG. 2A shows an example embodiment using selective turbocharger speed maintenance, such turbocharger speed maintenance can alternatively be used continuously during idle and/or deceleration conditions.

Figure 2B:
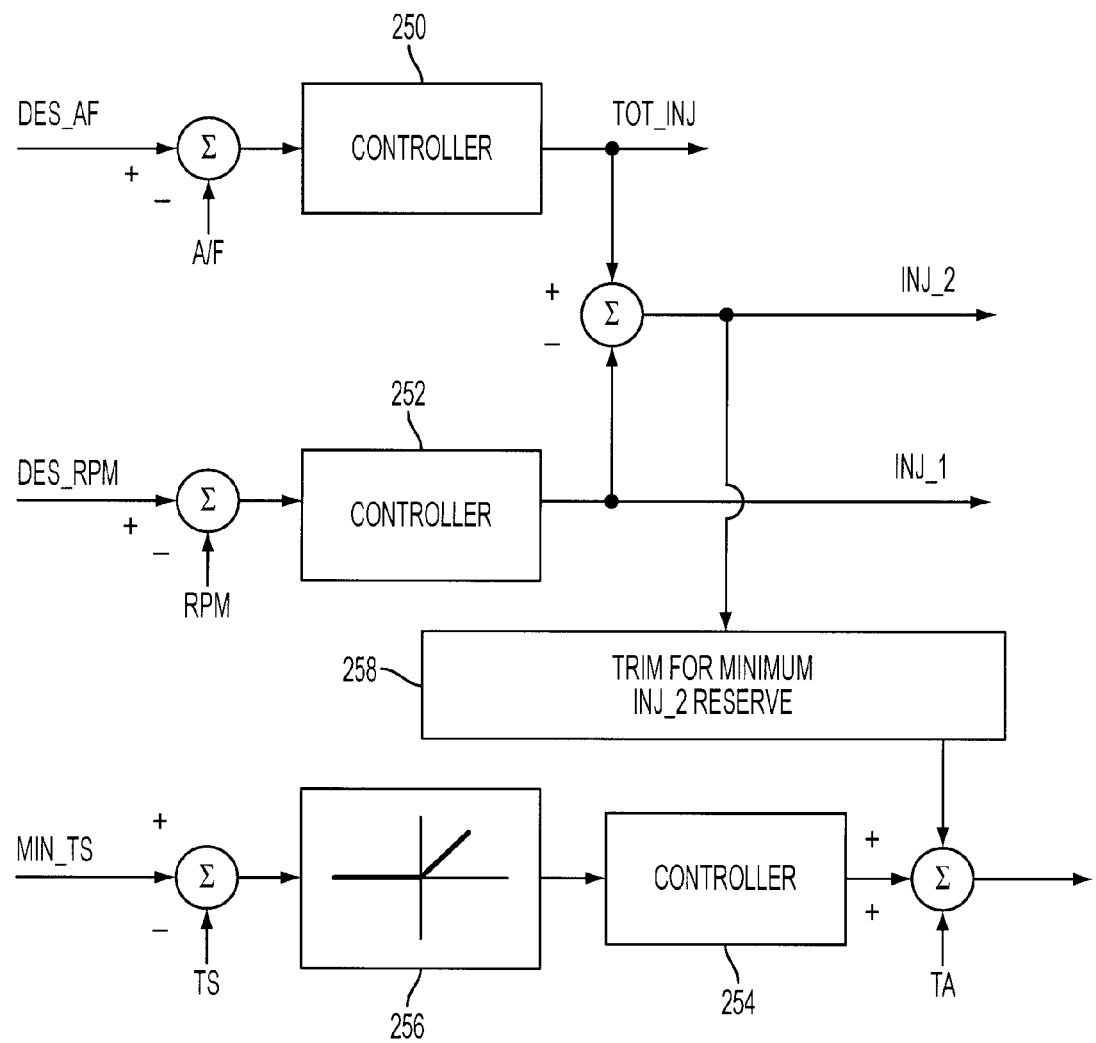
FIGS. 2B-2C show example block diagram control systems for addressing idle speed control, turbocharger speed maintenance, and air-fuel ratio control.

One embodiment of a control diagram representation that relates to FIG. 2A is shown in FIG. 2B. Specifically, FIG. 2B shows how the desired values for air-fuel ratio (DES_AF), engine idle speed (DES_RPM), and turbine speed (DES_MIN_TS) drive adjustments in a first and second fuel injection amounts, as well as throttle angle, in a coordinated way. A first controller 250 is shown for feedback control of exhaust mixture air-fuel ratio (not necessarily combustion air-fuel ratio), where a desired air-fuel ratio (DES_AF) is compared to measured or estimated air-fuel ratio (A/F) to form an error signal fed to the controller. The controller, which may be a proportional, integral, and/or derivative controller, for example, then determines a total fuel injection amount (TOT_INJ), which may represent the total fuel delivered over a plurality of injections for a given cylinder cycle. Specifically, the total fuel injection may represent a total of the first injection event (used for combustion and torque generation), and the second, late, injection used for heat generation in the exhaust. Note that other controller forms may be used, such as linear, non-linear, etc.

Additionally, a second controller 252 is shown for feedback control of engine speed, such as engine idle speed, where a desired engine speed (DES_RPM) is compared to measured or estimated engine speed (RPM) to form an error signal fed to the controller. The controller 252 then determines a first fuel injection amount (INJ_1), which may be delivered during the intake and/or compression stroke, and which combusts to generate torque in the engine. Further, the block diagram illustrates how the injection amount for the second injection (INJ_2) may then be determined by subtracting the first fuel injection amount from the total fuel injection amount.

A third controller 254 is shown for feedback control of turbocharger speed, where a minimum desired turbocharger speed (DES_MIN_TS) is compared to measured or estimated turbocharger speed (TS) to form an error signal fed first to a non-linear block 256, and then to the controller. Block 256 operates to form an on-sided controller where only underspeed errors are corrected by the controller 254. The controller 254 then determines a throttle angle adjustment, which is used along with a trim from block 258, to form a desired throttle angle (TA). The trim from block 258 is based on the amount of the second injection (INJ_2), and used to maintain a minimum reserve for dynamic range. For example, the control system may utilize longer term trim of throttle angle so that during engine idle speed error rejection, the second injection is less likely to fall below a minimum injection pulsewidth.

In this way, control of air-fuel ratio, idle speed, and turbocharger speed can be coordinated when utilizing split injection operation, while also reducing likelihood of reaching range of authority limits in the control actuators.

Continuing with the block diagram of FIG. 2B, it may result in various operation. For example, when controlling exhaust heat to maintain turbocharger speed above the minimum value, the system may increase airflow while also increasing the relative size of the first to the second injection, and also increasing the total injection of fuel to match the increased airflow, thereby generating increased exhaust heat. Such operation may also be used to maintain idle speed and counteract a decrease in fuel-based lean combustion torque reserve. As another example, the system may increase the relative size of the first injection to the second injection quickly to counteract sudden loads on the engine or sudden drops in engine speed. However, lower frequency adjustments may be handled by airflow adjustments to maintain sufficient heat for turbocharger speed control. Further still, while not illustrated in FIG. 2B, the number of cylinders utilizing a split injection may be adjusted to maintain turbocharger speed (e.g., increasing the number of cylinders with split injection to increase exhaust heat).

Figure 2C:
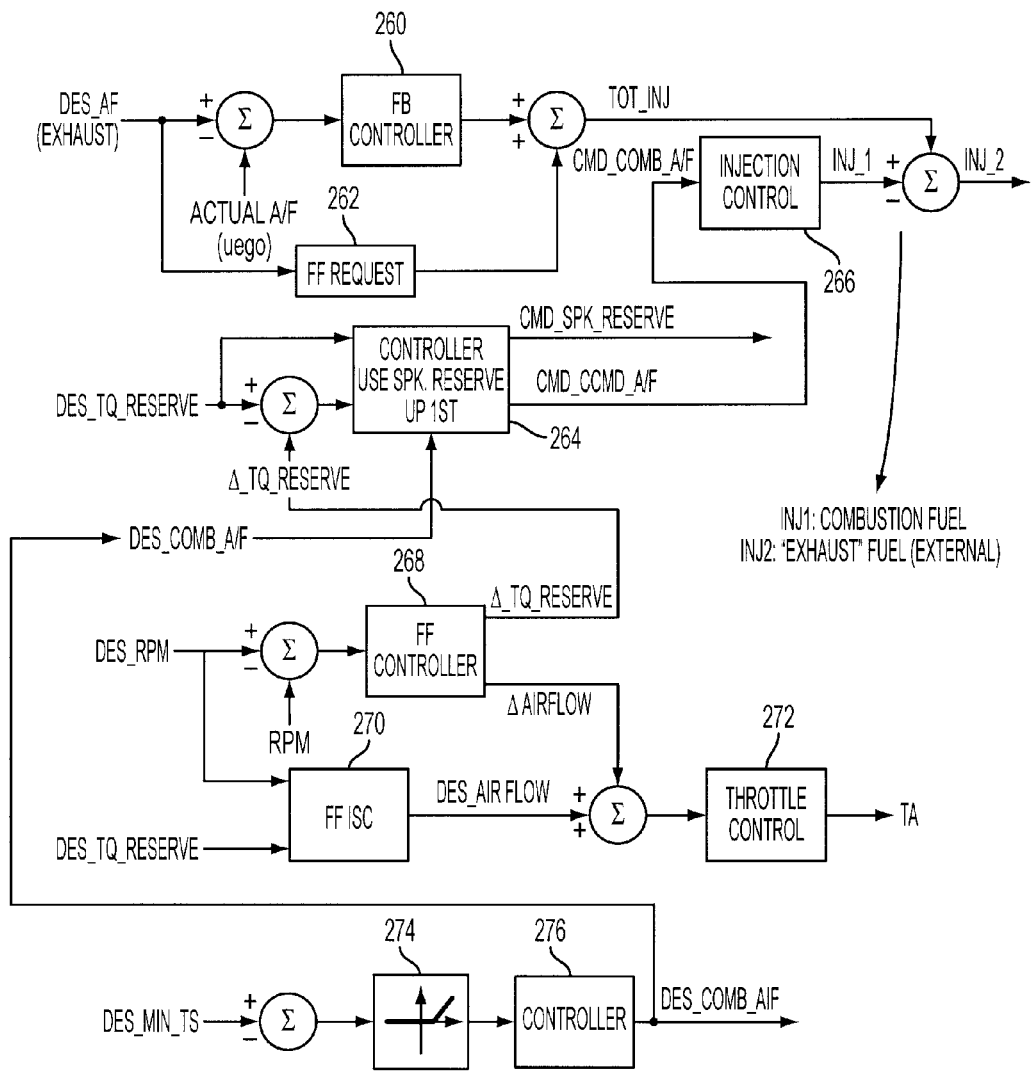

Referring now to FIG. 2C, another example block diagram is illustrated similar to that of FIG. 2B. Specifically, FIG. 2C shows how the desired values for air-fuel ratio (DES_AF), engine idle speed (DES_RPM), torque reserve (DES_TQ_RESERVE) and turbine speed (DES_TRPM) drive adjustments in a first and second fuel injection amounts, as well as throttle angle, spark reserve, and air-fuel ratio in a coordinated way. A feedback controller 260 and feedforward controller 262 are shown for control of exhaust mixture air-fuel ratio (not necessarily combustion air-fuel ratio), where a desired air-fuel ratio (DES_AF) is compared to measured or estimated air-fuel ratio (A/F) to form an error signal fed to controller 260, and the desired air-fuel ratio is fed to controller 262. The controllers then determine a total fuel injection amount (TOT_INJ), which may represent the total fuel delivered over a plurality of injections for a given cylinder cycle. Specifically, the total fuel injection may represent a total of the first injection event (used for combustion and torque generation), and the second, late, injection used for heat generation in the exhaust. Note that various controller forms may be used.

Additionally, a torque reserve controller 264 is shown for maintaining sufficient torque reserve to reject disturbances during idle speed control. The controller receives the desired torque reserve, as well as a torque reserve adjustment (D_TQ_RESERVE) to partition the torque reserve between a commanded spark torque reserve (CMD_SPK_RESERVE), if any, and a commanded combustion air-fuel ratio, which may also represent the air-fuel torque reserve, (CMD_COMB_A/F), if any. The controller may partition the torque reserve based on operating conditions. For example, under some conditions, all of the reserve may be partitioned to the spark reserve, and under other conditions, all of the reserve may be partitioned to the air-fuel reserve. As another example, the reserve may be partitioned to both, in varying proportions, based on operating conditions as described herein. Further still, controller 264 may command the system to first adjust the spark reserve before adjusting the combustion air-fuel ratio and affecting the air-fuel reserve.

Based on the commanded air-fuel torque reserve, controller 266 determines the first injection amount, which along with the total injection amount, determines the second injection amount.

Continuing with FIG. 2C, feedback controller 268 and feedforward controller 270 provide control of engine speed, such as engine idle speed, where a desired engine speed (DES_RPM) is compared to measured or estimated engine speed (RPM) to form an error signal fed to the controller. The controller 268 determines both the adjustment to the torque reserve (D_TQ_RESERVE), as well as a change in airflow (D_AIRFLOW). The change in airflow is added to a desired airflow (DES_AIRFLOW) determined by controller 270 responsive to the desired idle speed and the desired torque reserve. The summed airflow is then fed to the throttle controller 272 to adjust the throttle angle to provide the desired airflow (e.g., responsive to a mass airflow sensor). The change in airflow operates to drive the torque reserve adjustment to a small value (e.g., near zero), and thus back to the desired conditions for turbocharger speed control and idle speed control with sufficient torque reserve.

Finally, controller 276 is shown for feedback control of turbocharger speed, where minimum desired turbocharger speed (MIN_TS) is compared to measured or estimated turbocharger speed (TS) to form an error signal fed first to a non-linear block 274, and then to the controller 276, similar to that of FIG. 2B, to generate the desired combustion air-fuel ratio (DES_COMB_A/F). Controller 276 may be a non-linear controller that adjusts the desired combustion air-fuel ratio to maximum lean air-fuel ratio for the engine operating conditions. However, other control architectures may also be used.

In this way, control air-fuel ratio, idle speed, and turbocharger speed can be coordinated when utilizing split injection operation, while also reducing likelihood of reaching range of authority limits in the control actuators.

Figure 3:
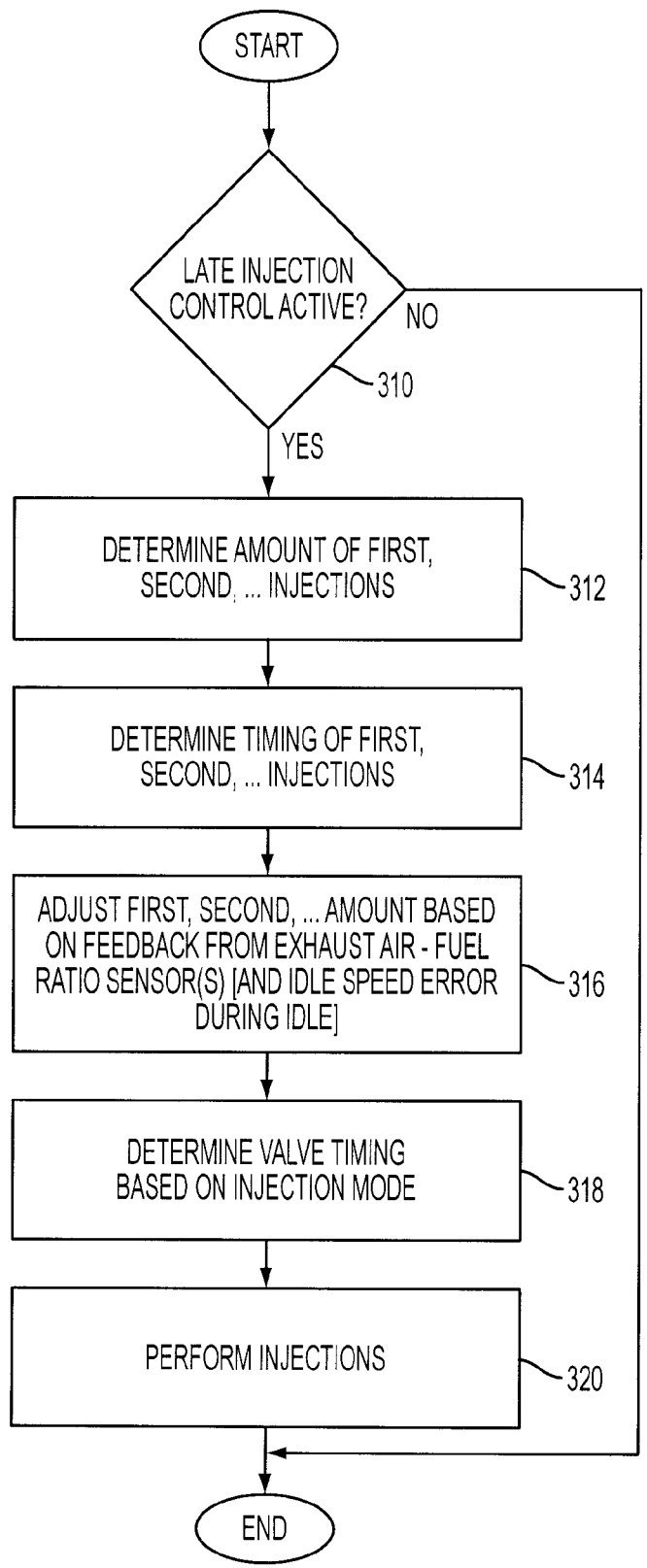

Referring now to FIG. 3, a routine is described for controlling injection amounts of at least a first and second direct fuel injection to the cylinder during turbocharger speed maintenance. In 310, the routine determines whether late injection control is active, such as determined with regard to FIG. 2. If so, the routine continues to 312 to determine an injection amount of a plurality of injection for a given cylinder cycle. In one example, the routine determine an amount of a first and second direct injection, where the first injection is performed either during an intake and/or compression stroke and combusted to produce engine torque, and a second direct injection after combustion, which may be late during an exhaust stroke to provide unburned fuel to the exhaust. The desired first injection amount may be based on a desired engine output (e.g., engine torque), while the second injection amount may be based on turbocharger speed, desired turbocharger speed, etc., as noted herein.

Next, in 314, the routine determines timing of the injection amounts of 312, such as relative to crank angle, piston position, intake valve timing, exhaust valve timing, and/or other parameters. In one example, the timing may further be adjusted based on the injection amounts, to provide delivery of the fuel at an appropriate time.

In 316, the routine then adjusts the injection amounts based on feedback from exhaust air-fuel ratio sensors so that the exhaust air-fuel ratio is maintained at or oscillates about a desired value, and further based on engine idle speed errors during idle speed control. For example, when using a first and second injection, the second injection amount may be adjusted based on both errors in the turbocharger speed, as well as errors in air-fuel ratio. Further, the first injection amount may be temporarily adjusted based on idle speed errors during idle speed control. In such a case, the second injection amount may be temporarily adjusted by a corresponding amount to maintain air-fuel ratio. Of course, alternative approaches may also be used. Thus, in one approach, a total injection amount may be set based on air-fuel ratio, and the relative amount of the first and second injections may be adjusted to balance maintaining air-fuel ratio, turbocharger speed, and engine output torque (or idle speed during idle conditions). Further throttle control can also be coordinated with such adjustments, as described in further detail herein with regard to FIG. 4, for example.

Then, in 318, the routine determines a valve timing based on the injection mode, amounts, and/or timings, and then in 320 the injections are performed as determined. For example, the valve timing and/or lift (e.g., intake valve opening/closing timing and/or exhaust valve opening/closing timing, intake valve lift, valve overlap, negative valve overlap, etc.) may be adjusted based on whether directly injected fuel in the cylinder is exhausted for turbocharger speed maintenance is used.

Figure 4:
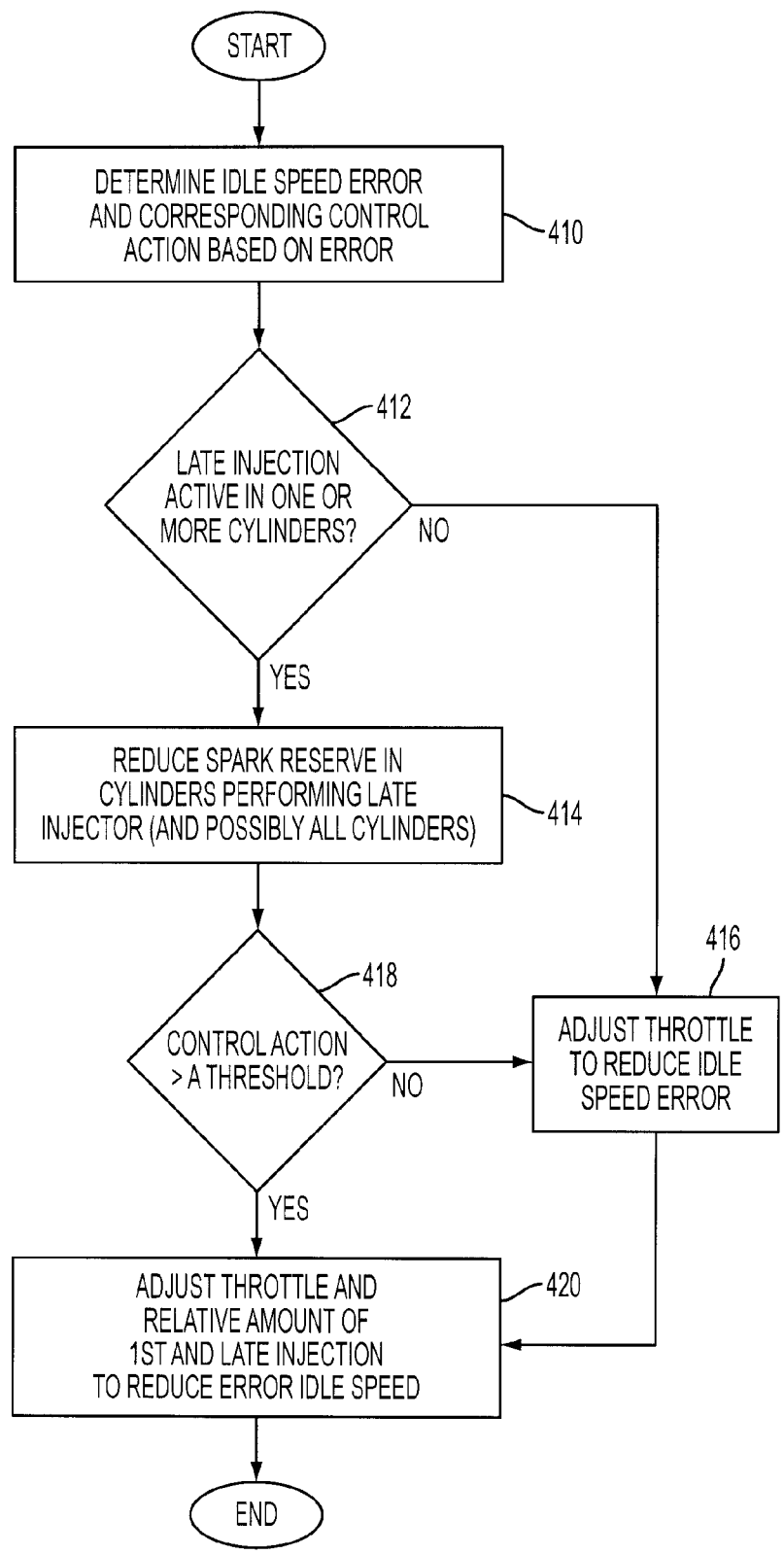

Referring now to FIG. 4, a routine is described for coordinating lower bandwidth throttle adjustments used to maintain sufficient control authority for idle speed control, while also maintaining turbocharger speed. In one example, idle speed load rejection via adjustment of the injection amount that is combusted in the cylinder—e.g., fuel-based idle speed control with lean combustion—can operate at a higher bandwidth, throttle adjustments can be used to handle longer term, or steady state, corrections via airflow control. And, as already noted, the higher bandwidth adjustments can be trimmed out via the throttle on a time scale that limits any impact on turbo speed maintenance.

Turning now to FIG. 4, in 410, the routine determines idle speed error, if any, and corresponding control action based on the error and/or based on feed forward parameters, such as power steering action, air/condition compressor operation, electrical loads, generator loads, etc. For example, a proportional, integral, and derivative control action may be determined. In another example, a non-linear controller may be used. Then, in 412, the routine determines whether late injection is active in one or more cylinders. If so, the routine continues to 414 to reduce spark retard reserve in cylinders performing the late injection, and possibly in all cylinders, even those without late injection (in the example where some cylinders utilize late injection for turbocharger speed maintenance, and others do not). If not, the routine continues to 416, discussed further below.

From 414, the routine continues to 418 to determine whether the amount of control action of 410 is greater than a threshold. If so, the routine continues to 420 to adjust throttle opening and the relative amount of a first and second injection to reduce idle speed error. Otherwise, the routine continues to 416 where spark reserved is maintained in the cylinders, and the routine adjusts the throttle and spark advance to reduce idle speed error.

For example, in one embodiment, the routine may be providing a first and second injection amount, where the first amount produces a lean combustion and sufficient torque to maintain idle speed, while the second injection provides additional exhaust reductant to match excess air of combustion, and generate sufficient exhaust energy to maintain the turbocharger speed at a target speed. However, upon the control action (or idle speed error) reaching a threshold value (e.g., due to a sudden load on the engine, or due to an engine misfire, etc.), the first amount may be increased, and the second injection amount decreased by a corresponding amount, to temporarily increase combustion torque (as excess air is already present).

Further, if spark reserve is present in one or more (or all) cylinders, it may be used in combination with the adjustment to the first and second injection to provide the rapid torque increase in response to the idle error. For example, the fuel injection adjustment may be used in cylinders using a first and second injection, while spark advancement can be used in cylinders having a spark reserve without the late (second) injection. As another example, in response to the idle error or a sudden torque disturbance, the cylinders with spark reserve authority may first be adjusted to advance spark timing. Once the spark authority was exhausted, the first and second injection may be adjusted in cylinders having a first and second injection. Such operation enables the split injection heat generation to continue for as long as possible, even during correction of most idle speed errors.

In another embodiment where both fuel injection adjustments and spark reserve are used to control idle speed and turbocharger speed, the spark reserve can be held until the control action reaches a second, greater threshold than the threshold of 418. In this way, the spark advance is used only after fuel injection adjustment reaches a control limit (such as reducing the second injection to below the minimum pulse width, indicating that it is set to zero).

Figure 5:
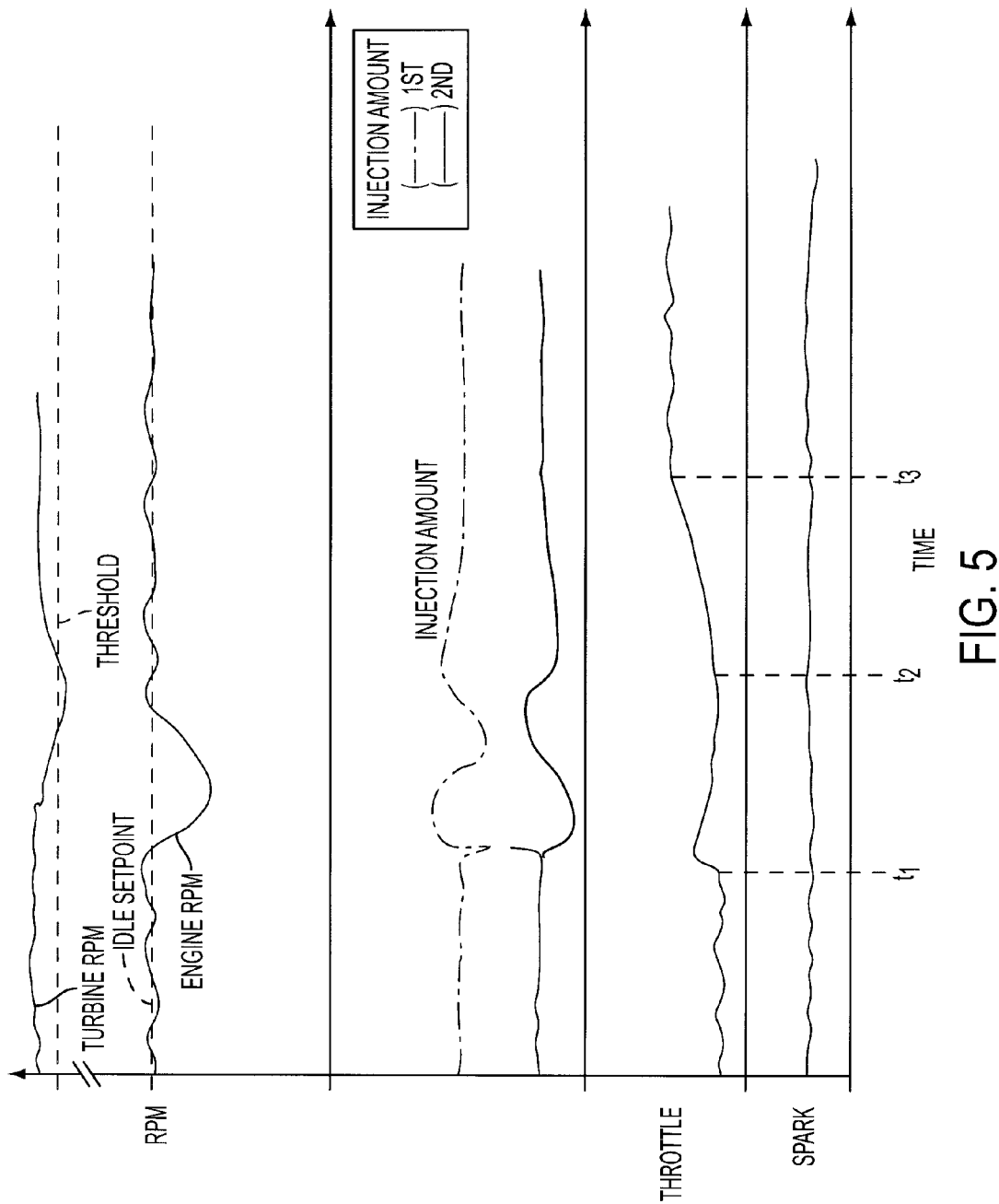
FIGS. 5 and 8 show prophetic examples of operation of several embodiments.

Referring now to FIG. 5, it illustrates a prophetic example of operation. The top graph shows engine idle speed and turbine speed over time, the second graph shows the first and second injection amounts, and the third graph shows throttle opening, and the bottom graph shows spark angle. As shown, the idle speed is originally maintained at the set-point, and the turbine speed is maintained above a threshold value.

At t1 a disturbance causes a speed error in which idle speed drops. In response thereto, the routine adjusts the first and second injection amounts to increase the combusted fuel with lean combustion (although less lean due to increased fuel), while correspondingly decreasing the late injection until the engine idle speed is again brought to the set-point value. However, as the fueling adjustment resulted in less late injection than needed to maintain turbocharger speed above the threshold turbine speed, the throttle is adjusted at t2 to increase total airflow, and the fuel injection amounts correspondingly returned to the desired amounts for turbocharger speed maintenance at t3 (e.g., in the case where a load is placed and maintained on the engine requiring an increase in output torque at steady state to maintain idle speed at the set-point). Note that the third graph shows the injection amounts relative to stoichiometry, and thus it does not show the increase in both the first and second injection amounts that correspond to the increased airflow resulting from the throttle adjustments.

Figure 6:
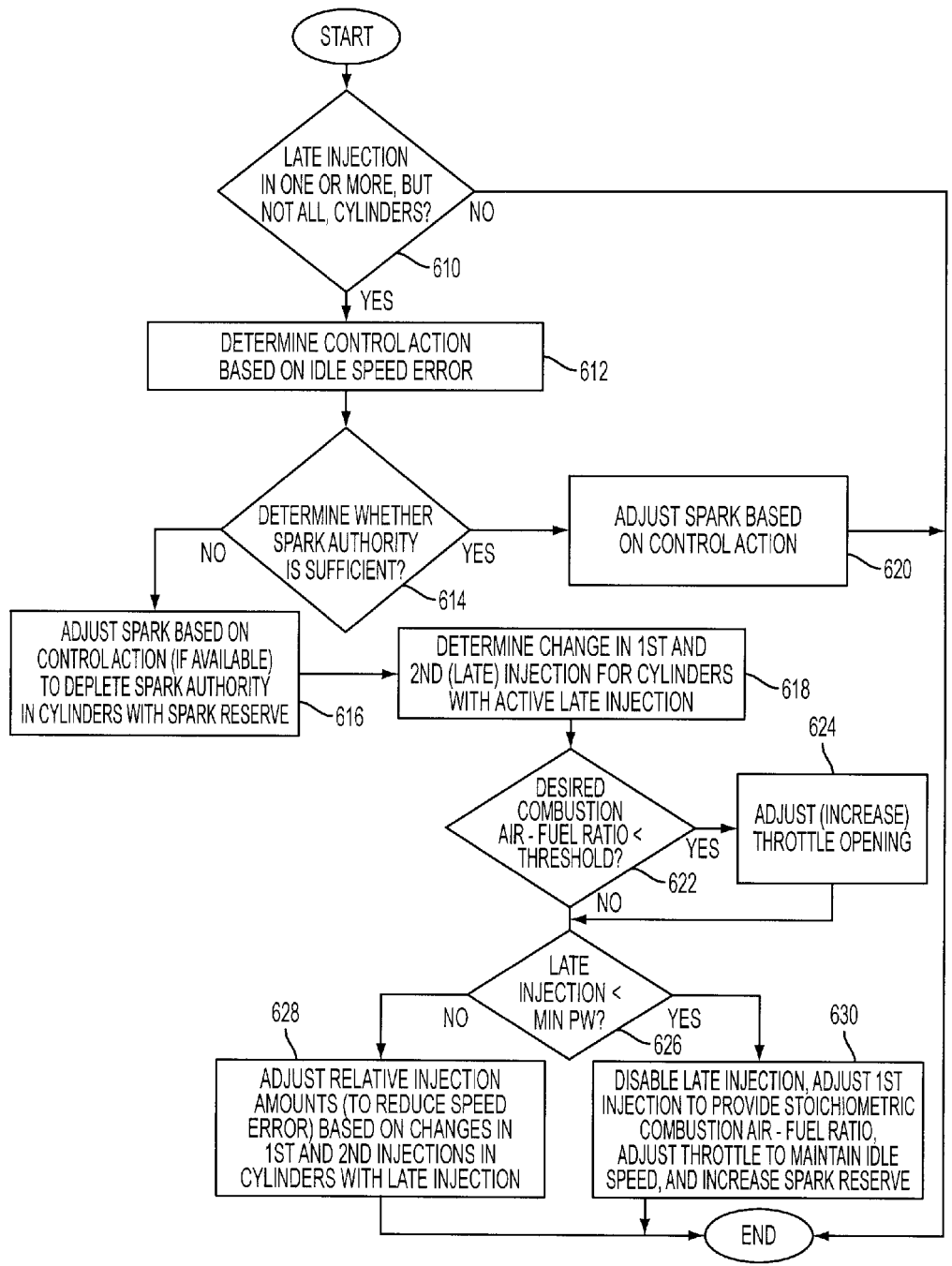

Referring now to FIG. 6, another routine is described for controlling injections, throttle, and spark timing in coordination to maintain idle speed and turbocharger speed when the fuelling adjustment reaches a limit value (in the example where some cylinders utilize a first and second injection, and other cylinders utilize spark reserve). Specifically, in 610, the routine determines whether late injection in one or more, but not all, cylinders is active. If so, the routine continues to 612 to determine control action based on idle speed error between a desired idle speed and actual idle speed. Then, in 614, the routine determines whether sufficient spark reserve authority is present to meet the desired control action of 612. For example, if no spark reserve is present, the routine continues to 616. Alternatively, if one or more (or all) cylinder have some spark reserve, but still insufficient to meet the control action, the routine still continues to 616 to utilize the available spark reserve, but then utilizes additional control actions in 618 where adjustment to the first and second injections are determined. Otherwise, when sufficient spark authority is present in 614, the routine continues to 620 to adjust the spark advance based on the control action to control idle speed.

Continuing with FIG. 6, from 618, the routine continues to 622 to determine whether the desired combustion air-fuel ratio generated via the change in the first injection (for cylinders with late injection) is greater than a threshold value. For example, combustion beyond a selected ratio (e.g., richer than 17:1) may be avoided. As such, in this case, the routine continues to 624 to adjust the throttle opening to increase airflow and reduce the potential from the air-fuel ratio increasing beyond the threshold.

Then, in 626, the routine, the routine determines whether the second (late) injection amount is less than a minimum pulsewidth (MIN_PW). In one example, the minimum pulsewidth may represent a minimum pulsewidth under which the injector can operate accurately under given operating conditions.

If so, in 630, the routine adjusts injection amounts of the first amount to provide a stoichiometric combustion injection and sets the second injection amount to zero. Further, the routine adjusts throttle to maintain idle speed, and increases spark reserve in one or more cylinders. Note the transition out of the mode using the second (late) injection may be managed as described herein with regard to FIG. 7, for example. Otherwise, in 628, the routine provides the changed first and second injection amounts determined in 618 to reduce the speed error, in cylinders with late injection.

Figure 7:
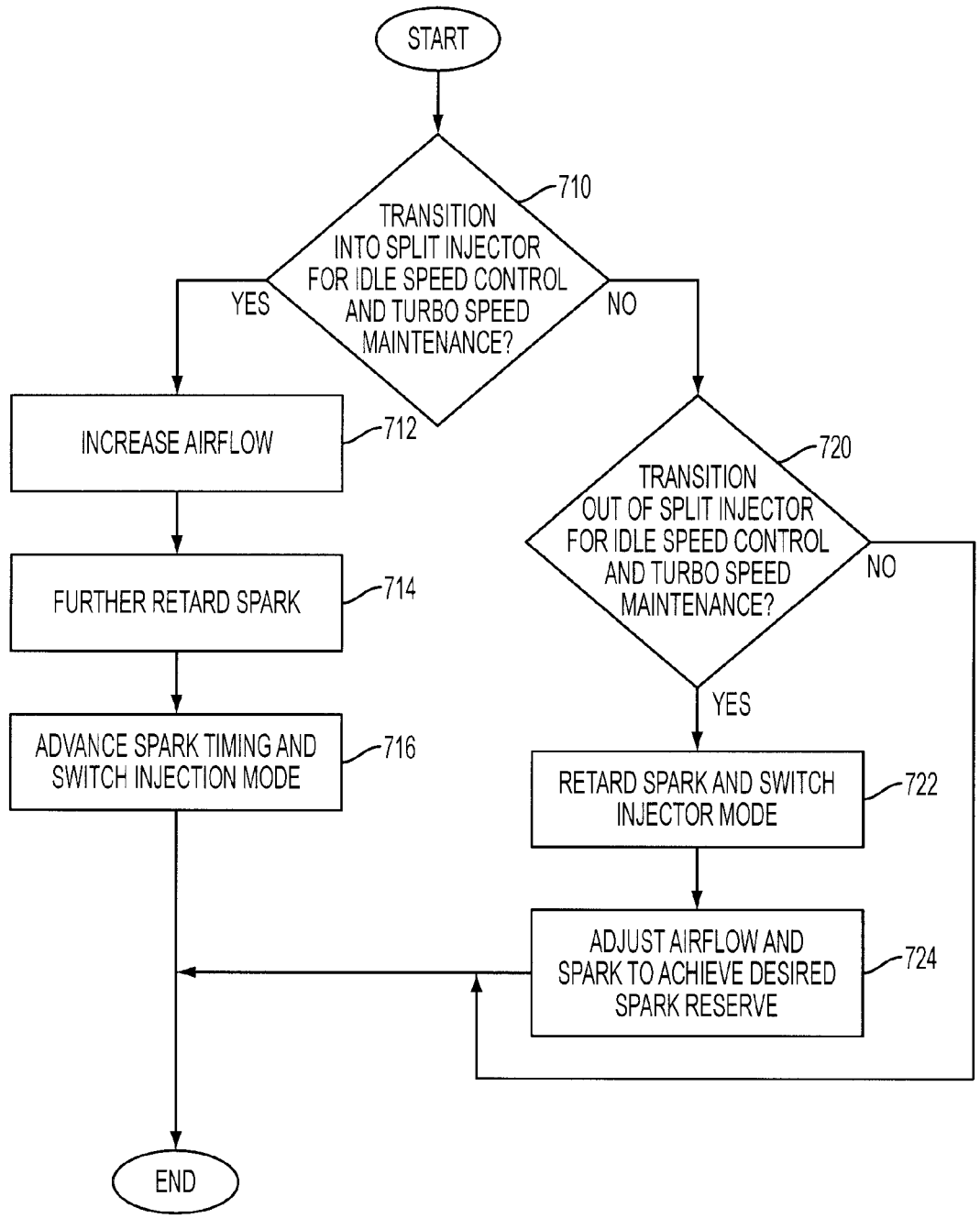

Referring now to FIG. 7, a routine is described for controlling transitions between a first operating mode including turbocharger speed maintenance via late injection, and operation without such action. Specifically, in 710, the routine determines whether a transition into split injection operation for idle speed control and turbocharger speed maintenance is present. If so, the routine continues to increase airflow (via throttle adjustment) in 712, further retard spark angle in 714, and then advance spark angle while switching the injection mode in 716. In this way, engine torque can be maintained in 712 and 714 via coordinated preparation of countervailing effects of increased airflow and retarded spark angle. Then, upon activation of multiple injections (where the second injection does not produce engine torque), the effect of a smaller first injection (which is used to maintain air-fuel ratio) can be counteracted via the advance of spark angle.

Alternatively, in 720, the routine determines whether a transition out of split injection operation for idle speed control and turbocharger speed maintenance is present. If so, the routine continue to retard spark angle which changing injection modes in 722 to a single injection, and then further adjusts airflow and spark to achieve a desired spark reserve in 724. In this way, engine torque and air-fuel ratio are again maintained.

Figure 8:
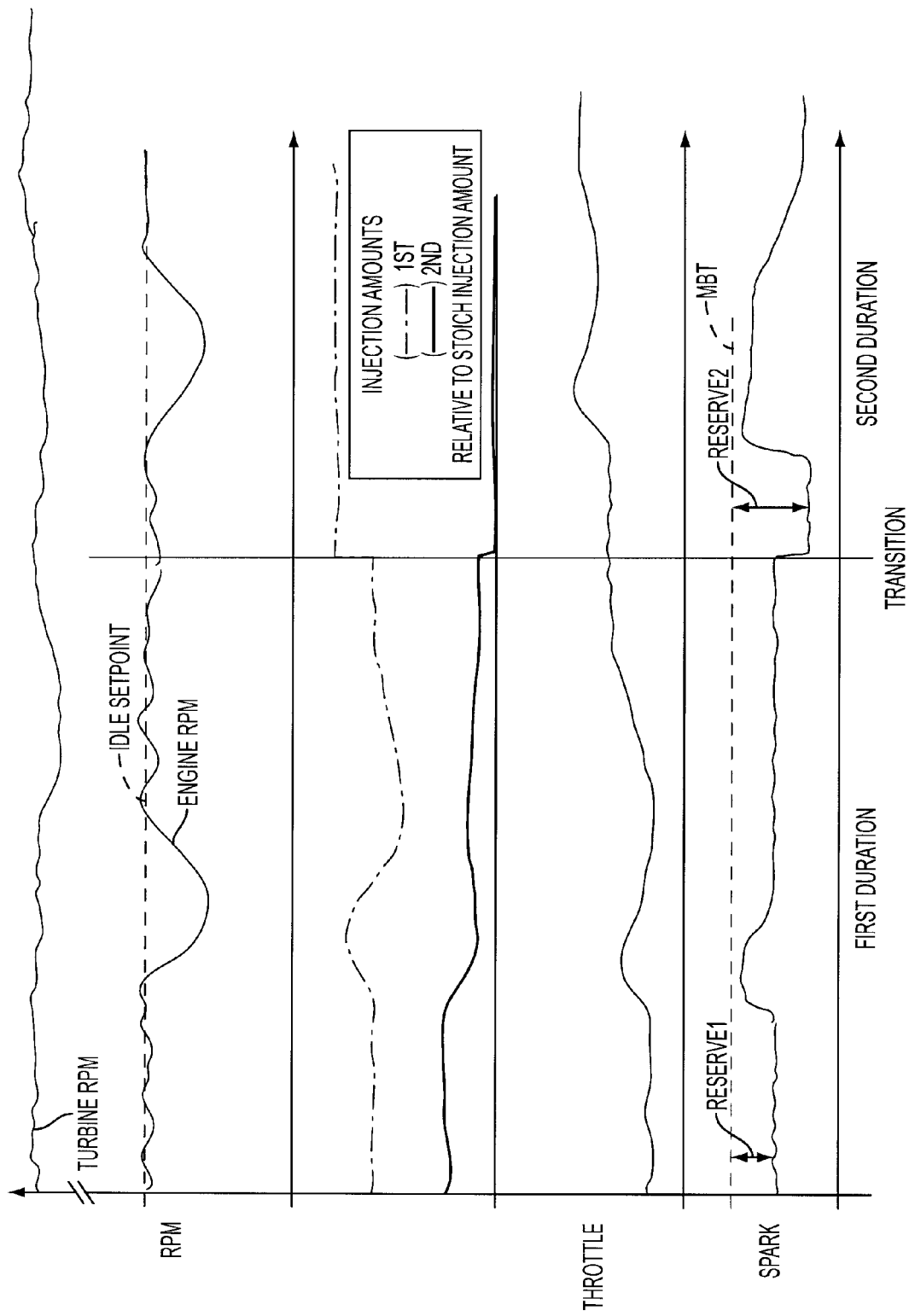

FIG. 8 illustrates another prophetic example of operation in which coordination of throttle, spark, and a first and second injection amount are used to control air-fuel ratio, idle speed, and turbocharger speed during a first duration. Then, for a second duration that is transitioned into following the first duration, spark retard is used with only a single injection and throttle adjustment. Specifically, the top graph shows engine idle speed and turbine speed over time, the second graph shows the first and second injection amounts, the third graph shows throttle opening, and the bottom graph shows spark angle. As shown, the idle speed is originally maintained at the set-point, and the turbine speed is maintained above a threshold value.

Similar to FIG. 5, a disturbance causes a speed error in which idle speed drops. In response thereto, the routine adjusts the first and second injection amounts to increase the combusted fuel with lean combustion (although less lean due to increased fuel), while correspondingly decreasing the late injection until the engine idle speed is again brought to the set-point value to maintain air-fuel ratio. However, as the fueling adjustment resulted in less late injection than needed to maintain turbocharger speed above the threshold turbine speed, the throttle may be adjusted to increase total airflow, and the fuel injection amounts correspondingly returned to the desired amounts for turbocharger speed maintenance (e.g., in the case where a load is placed and maintained on the engine requiring an increase in output torque at steady state to maintain idle speed at the set-point). Note that the third graph shows the injection amounts relative to stoichiometry, and thus it does not show the increase in both the first and second injection amounts that correspond to the increased airflow resulting from the throttle adjustments.

At the transition, the second injection is ceased, and the first injection is correspondingly adjusted. However, to account for the resulting torque increase that would otherwise occur, spark angle is retarded. Such operation not only maintains torque through the transition, but also provides a desired spark reserve that may be used for idle speed control as indicated to maintain speed in response to a second disturbance.

Note that while the above example may refer to a first and second, late, injection, where the first is combusted and the second primarily exhausted, more than two injections may be used. For example, two injections may be used before combustion, and third, late, injection used that is exhausted. In any case the above examples, routines, and description should be understood to apply to various numbers of injections.

Figure 9:
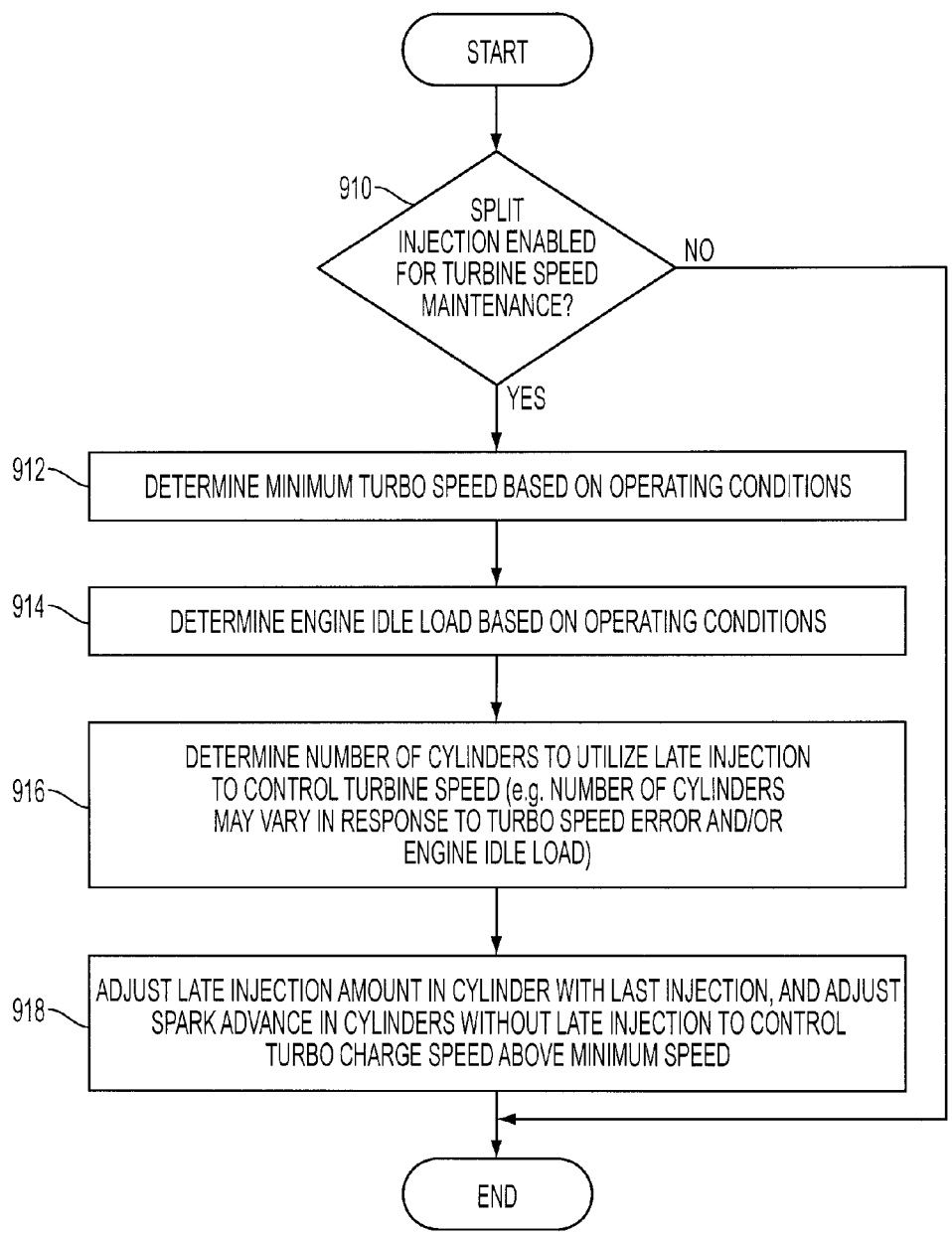

Referring now to FIG. 9, a routine is described for varying a number of cylinders carrying out split injection for turbocharger speed maintenance. First, in 910, the routine determines whether split injection is enabled for turbocharger speed maintenance. If so, the routine continues to 912 to determine a minimum desired turbocharger speed based on operating conditions, as described herein. Then, in 914, the routine determines engine idle load based on operating conditions. Next, in 916, the routine determines a number of cylinder in which to utilize additional (e.g., late) injection to control turbine speed based on turbine operation and engine idle load. For example, the routine may vary a number of cylinders with split injection in response to turbocharger speed dropping below the minimum value. Further, the routine may vary such operation in response to engine load to maintain sufficient dynamic range with respect to actuators used to maintain engine idle speed as described herein. For example, feed forward information from auxiliary loads may be used to select the number of cylinders with split injection. Next, in 918, the routine adjusts an amount of late fuel injection in cylinders with late injection, and adjusts spark advance in cylinders without late injection to control turbocharger speed above the minimum value. Further, additional adjustments may also be used, such as adjustment of spark timing in cylinders with late injection, exhaust gas recirculation, etc.

In this way, it may be possible to utilize variation in the number of cylinders with split injection to better maintain turbocharger speed while balancing effects on engine idle speed disturbance rejection, fuel usage, and limitations on spark retard and lean combustion.

The specific routines described in the flowcharts and diagrams may represent one or more of any number of processing strategies such as event-driven, interrupt-driven, multitasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12.

It will be appreciated that the configurations and routines disclosed herein are exemplary in nature, and that these specific embodiments are not to be considered in a limiting sense because numerous variations are possible. The subject matter of the present disclosure includes all novel and nonobvious combinations and subcombinations of the various system and exhaust configurations, algorithms, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for controlling engine operation for an engine having a turbocharger and direction injection, the method comprising:

in response to a driver brake release, performing at least a first and second injection during a cylinder cycle, the first injection generating a lean combustion and the second injection injected after the first such that it at least partially exits the cylinder into an exhaust upstream of a turbine of the turbocharger, where said at least first and second injection are further performed responsive to turbocharger speed; and during selected idle conditions:
adjusting at least the first injection to maintain engine idle speed;
adjusting at least the second injection to maintain exhaust air-fuel ratio about stoichiometry; and
adjusting airflow to maintain turbocharger speed above a threshold value.

2. The method of claim 1 where the driver brake release includes release of a brake pedal, and whether the engine is in an idle condition.

3. The method of claim 1 where the driver brake release includes release of a brake pedal of a vehicle, and whether the vehicle is in a deceleration condition.

4. The method of claim 1, where the adjustments of the first injection, second injection, and airflow are coordinated with respect to one another, and said selected idle conditions are identified by conditions indicative of a transient torque increasing condition.

5. The method of claim 1, where if the second injection is decreased so that the second injection results in a command signal to an injector below a minimum pulse width, the second injection is disabled and a spark reserve is increased in response thereto.

6. The method of claim 1, wherein an amount of the first and second injections is selected to maintain increased turbine speed, the method further comprising adjusting throttle angle based on an amount of the first and second injections to maintain sufficient torque reserve with respect to the first injection relative to a maximum injection that corresponds to stoichiometric combustion.

7. The method of claim 1, wherein the lean combustion is spark ignited, the method further comprising reducing a spark retard reserve during the selected idle conditions compared with idle speed conditions using only a single direct injection, where the lean combustion is spark ignited, and the exhaust air-fuel ratio oscillates about stoichoimetry, where the performing is carried out during a first idle speed control condition, the method further comprising adjusting at least spark timing to maintain engine idle speed during a second idle speed control condition.

* * * * *